(12) United States Patent
Odani

(10) Patent No.: US 7,747,905 B2
(45) Date of Patent: Jun. 29, 2010

(54) MAINTENANCE SYSTEM, METHOD OF CONTROLLING MAINTENANCE SYSTEM, SERVER, RECORD MEDIUM IN WHICH PROGRAM USED FOR SERVER IS RECORDED, COMPUTER AND RECORD MEDIUM IN WHICH PROGRAM USED FOR COMPUTER IS RECORDED

(75) Inventor: Makoto Odani, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 398 days.

(21) Appl. No.: 11/770,841

(22) Filed: Jun. 29, 2007

(65) Prior Publication Data

US 2008/0126870 A1    May 29, 2008

(30) Foreign Application Priority Data

Jun. 30, 2006   (JP)   ............................. 2006-182866

(51) Int. Cl.
*G06F 11/00* (2006.01)
(52) U.S. Cl. ........................................................ 714/48
(58) Field of Classification Search ................... None
See application file for complete search history.

(56) References Cited

U.S. PATENT DOCUMENTS

| | | | | |
|---|---|---|---|---|
| 5,239,547 A | * | 8/1993 | Tomiyama et al. | 714/26 |
| 6,026,500 A | * | 2/2000 | Topff et al. | 714/26 |
| 7,107,491 B2 | * | 9/2006 | Graichen et al. | 714/37 |
| 7,213,174 B2 | * | 5/2007 | Dahlquist et al. | 714/37 |
| 7,379,846 B1 | * | 5/2008 | Williams et al. | 702/185 |
| 2002/0059214 A1 | * | 5/2002 | Shibusawa et al. | 707/3 |
| 2006/0048019 A1 | * | 3/2006 | Takahashi | 714/48 |
| 2006/0107088 A1 | * | 5/2006 | Katayama et al. | 714/4 |

FOREIGN PATENT DOCUMENTS

| | | |
|---|---|---|
| JP | 09-030092 | 2/1997 |
| JP | 2002-041691 | 2/2002 |
| JP | 2003-067162 | 3/2003 |

* cited by examiner

*Primary Examiner*—Michael C Maskulinski
(74) *Attorney, Agent, or Firm*—Turocy & Watson, LLP

(57) ABSTRACT

In a maintenance system according to the invention, in the management terminal, an input receiving unit receives an input of management information related to a condition of the managed machine, a second transmitting unit transmits the management information related to the condition of the managed machine to the server, in the server, a receiving unit receives the information related to the result of self-diagnosis transmitted and the management information transmitted, a memory unit stores the information related to the result of self-diagnosis and the management information on a database, a control unit analyzes a trouble-coping history of the managed machine which has a same type, and controls so as to output a analysis result of the trouble-coping history to one of the managed machine and the management terminal. With the maintenance system according to the invention, accurate maintenance information can be obtained.

12 Claims, 11 Drawing Sheets

| SERIAL NUMBER | | A00001 |
|---|---|---|
| KEY | ERROR CODE | TIME OF TROUBLE OCCURRENCE |
| 1 | E001 | 2004/03/22_13:03 |
| 2 | J001 | 2004/03/22_13:03 |
| 3 | J001 | 2004/03/23_08:42 |
| 4 | J001 | 2004/03/22_17:31 |
| 5 | ⋮ | ⋮ |
| 6 | ⋮ | ⋮ |

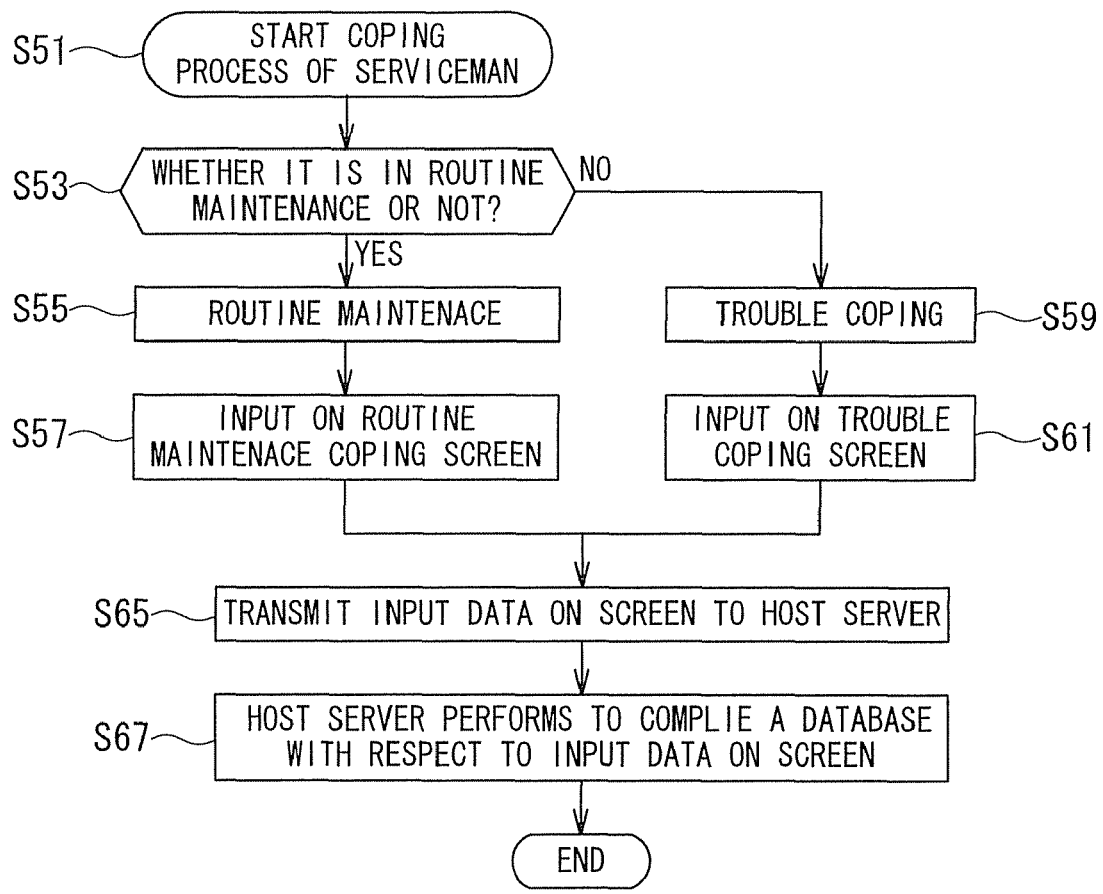

| | | |
|---|---|---|
| SERIAL NUMBER | A00001 | TIME OF TROUBLE OCCURRENCE  2004/03/22_13:03 |
| | | TIME WHEN MAINTENACE OF MANAGED MACHINE IS PERFORMED  2006/03/20_18:50 |

| | |
|---|---|
| TROUBLE CONTENT | E001 |
| COPING CONTENT FOR TROUBLE | PART EXCHANGE |
| PART 1 | BBB0566 |
| PART 2 | BHH30050 |
| PART 3 | |
| DETAIL DESCRIPTION | |

FIG. 6

| SERIAL NUMBER | JOBNO | ERROR CODE (TROUBLE CONTENT) | TROUBLE COPING | PART 1 | PART 2 | PART 3 |
|---|---|---|---|---|---|---|
| A00001 | 1 | E101 | PART EXCHANGE | BBB12345 | BBB30200 | BHH30200 |
| A00002 | 2 | J101 | PART EXCHANGE | ABB00001 | | |
| A00031 | 3 | J101 | PART EXCHANGE | ABB00001 | | |
| A00063 | 4 | E102 | PART EXCHANGE | BBB12345 | BBB30200 | |
| A00023 | 5 | J101 | PART EXCHANGE | ABB0001 | | |
| A00012 | 6 | J101 | PART EXCHANGE | ABB0001 | | |
| A00025 | 7 | E103 | PART EXCHANGE | BBB12345 | BBB30200 | |
| A00086 | 8 | J101 | PART EXCHANGE | ABB00001 | | |
| A00033 | 9 | J101 | CLEANING OF PART | ABB00001 | | |
| A00098 | 10 | E104 | PART EXCHANGE | BBB12345 | BBB30200 | |
| B00025 | 11 | E103 | PART EXCHANGE | BBB12345 | BBB30200 | |
| B00086 | 12 | J101 | CLEANING OF PART | ABB00001 | | |
| B00033 | 13 | J101 | CLEANING OF PART | ABB00001 | | |
| C00098 | 14 | E104 | PART EXCHANGE | BBB12345 | | |
| C00033 | 15 | J101 | CLEANING OF PART | ABB00001 | BBB30200 | |
| C00098 | 16 | E104 | PART EXCHANGE | BBB12345 | | |
| ... | ... | | | | | |

FIG. 7

SERIAL NUMBER: A00116
ERROR CODE: E160

| SERIAL NUMBER | TROUBLE COPING | PART 1 | PART 2 | PART 3 |
|---|---|---|---|---|
| A00003 | CLEANING OF PART | BBB12345 | BBB30050 | BHH30200 |
| A00004 | CLEANING OF PART | BBB12345 | BBB30050 | |
| A00005 | PART EXCHANGE | BBB12345 | BBB30050 | |
| A00008 | PART EXCHANGE | BBB12345 | BBB30050 | |
| A00011 | PART EXCHANGE | BBB12345 | BBB30050 | |
| A00012 | PART EXCHANGE | BBB12345 | BBB30050 | |
| A00014 | PART EXCHANGE | BBB12345 | BBB30200 | |
| A00016 | CLEANING OF PART | ABB00001 | | |
| A00016 | CLEANING OF PART | ABB00001 | | |
| A ......... | ............ | | | |

```
TROUBLE COPING
         1 PART EXCHANGE···60%
2 CLEANING···35%
3 ETC. ······5%

PART EXCHANGE
         1 BBB12345···85%
2 BHH30050···75%
3 BBB0556···20%
4 ETC. ······10%

CLEANING
         1 BBB12345···95%
2 ETC. ······5%
```

FIG. 10

SERIAL NUMBER No. A00001

| KEY | PRINTING COUNT | SCANNING COUNT | TENPERATURE | HUMIDITY | ACCESS TIME |
|---|---|---|---|---|---|
| 1 | 3512 | 1012 | 25 | 50 | 2004/04/03_00:00 |
| 2 | 2522 | 998 | 28 | 55 | 2004/04/04_00:00 |
| 3 | 3650 | 1035 | 23 | 60 | 2004/04/05_00:00 |
| 4 | 3702 | 1087 | 22 | 30 | 2004/04/06_00:00 |
| 5 | ⋮ | ⋮ | ⋮ | ⋮ | ⋮ |
| 6 | ⋮ | ⋮ | ⋮ | ⋮ | ⋮ |
| 7 | ⋮ | ⋮ | ⋮ | ⋮ | ⋮ |

MAINTENANCE SYSTEM, METHOD OF CONTROLLING MAINTENANCE SYSTEM, SERVER, RECORD MEDIUM IN WHICH PROGRAM USED FOR SERVER IS RECORDED, COMPUTER AND RECORD MEDIUM IN WHICH PROGRAM USED FOR COMPUTER IS RECORDED

BACKGROUND OF THE INVENTION

1. Field of the Invention

The present invention relates to a maintenance system, a method of controlling the maintenance system, a server, a record medium in which program used for the server is recorded, a computer and a record medium in which program used for the computer is recorded, in particular, in which maintenance information can be obtained.

2. Related Art

In recent years, managed machines such as a complex machine, a copy machine, a printer, and FAX are connected to the host server via a network or the Internet.

With the technology proposed in Japanese Unexamined Patent Application Publication No. 2002-41691, these managed machines are provided with a self-diagnostic function. When a trouble occurs in the managed machine, the managed machine transmits a status of the trouble to the host server. The host server can propose a necessary part (parts) and repair coping (trouble coping) with reference to a trouble diagnostic database which is composed of data related to the status of the trouble transmitted from these managed machines in advance.

However, it is necessary that in the trouble diagnostic database used for trouble diagnosing, a predetermined program used for repair coping corresponding to predetermined troubles is inputted in advance. Therefore, thus trouble diagnostic database is available with respect to troubles which can be expected. On the other hand, thus trouble diagnostic database is not available with respect to troubles which can not be expected. Accordingly, it is possible that the host server proposes wrong informations with respect to a necessary part (parts) and repair coping in this case. Furthermore, when the predetermined program used for repair coping gradually loses touch with actual trouble status, it is necessary to correct the trouble diagnostic database. As a result, it takes a lot of trouble with correcting the trouble diagnostic database.

SUMMARY OF THE INVENTION

The present invention was made in the view of the circumstances encouraged in the prior art mentioned above, and it is an object of the present invention to provide a maintenance system, a method of controlling the maintenance system, a server, a record medium in which program used for the server is recorded, a computer and a record medium in which program used for the computer is recorded, in which accurate maintenance information can be obtained.

In order to solve the above-mentioned circumstances, a maintenance system according to an aspect of the present invention includes: a managed machine, a management terminal managing the managed machine and a server connected to the managed machine and the management terminal via a network, wherein: the managed machine comprises: a self-diagnosing unit configured to self-diagnose a condition of the managed machine; and a first transmitting unit configured to transmit information related to a result of self-diagnosis by the self-diagnosing unit to the server; the management terminal comprises: an input receiving unit configured to receive an input of management information related to a condition of the managed machine; and a second transmitting unit configured to transmit the management information related to the condition of the managed machine whose input is received by the input receiving unit to the server, and, the server comprises: a receiving unit configured to receive the information related to the result of self-diagnosis transmitted by the first transmitting unit and the management information related to the condition of the managed machine transmitted by the second transmitting unit; a memory unit configured to store the information related to the result of self-diagnosis and the management information related to the condition of the managed machine on a database, and a control unit configured to analyze the database when a trouble occurs in the managed machine, analyze a trouble-coping history of the managed machine which has a same type as the managed machine in which the trouble occurs, and control so as to output a analysis result of the trouble-coping history to one of the managed machine and the management terminal.

In order to solve the above-mentioned circumstances, a method of controlling a maintenance system according to an aspect of the present invention includes: a managed machine, a management terminal managing the managed machine and a server connected to the managed machine and the management terminal via a network, wherein: the managed machine performs: self-diagnosing a condition of the managed machine; and transmitting information related to a result of self-diagnosis to the server; the management terminal performs: receiving an input of management information related to a condition of the managed machine; and transmitting the management information related to the condition of the managed machine whose input is received to the server, and, the server performs: receiving the information related to the result of self-diagnosis transmitted and the management information related to the condition of the managed machine transmitted; storing the information related to the result of self-diagnosis and the management information related to the condition of the managed machine on a database, analyzing the database when a trouble occurs in the managed machine, and analyzing a trouble-coping history of the managed machine which has a same type as the managed machine in which the trouble occurs, and controlling so as to output a analysis result of the trouble-coping history to one of the managed machine and the management terminal.

In order to solve the above-mentioned circumstances, a maintenance system according to an aspect of the present invention includes: a managed machine, a management terminal managing the managed machine, a server connected to the managed machine and the management terminal via a network, and a computer connected to the server via a network, wherein: the managed machine comprises: a self-diagnosing unit configured to self-diagnose a condition of the managed machine; and a first transmitting unit configured to transmit information related to a result of self-diagnosis by the self-diagnosing unit to the server; the management terminal comprises: an input receiving unit configured to receive an input of management information related to a condition of the managed machine; and a second transmitting unit configured to transmit the management information related to the condition of the managed machine whose input is received by the input receiving unit to the server, the server comprises: a receiving unit configured to receive the information related to the result of self-diagnosis transmitted by the first transmitting unit and the management information related to the condition of the managed machine transmitted by the second transmitting unit; and a memory unit configured to store the information related to the result of self-diagnosis and the management information related to the condition of the managed machine on a database, and, the computer comprises: a control unit configured to analyze the database when a trouble occurs in the managed machine, analyze a trouble-coping history of the managed machine which has a same type as the managed machine in which the trouble occurs, and control so as to output a analysis result of the trouble-coping history to one of the managed machine and the management terminal.

In order to solve the above-mentioned circumstances, a method of controlling a maintenance system according to an aspect of the present invention includes: a managed machine, a management terminal managing the managed machine and a server connected to the managed machine and the management terminal via a network and a computer connected to the server via a network, wherein: the managed machine performs: self-diagnosing a condition of the managed machine; and transmitting information related to a result of self-diagnosis to the server; the management terminal performs: receiving an input of management information related to a condition of the managed machine; and transmitting the management information related to the condition of the managed machine whose input is received to the server, the server performs: receiving the information related to the result of self-diagnosis transmitted and the management information related to the condition of the managed machine transmitted; and storing the information related to the result of self-diagnosis and the management information related to the condition of the managed machine on a database, and, the computer comprises: analyzing the database when a trouble occurs in the managed machine, analyzing a trouble-coping history of the managed machine which has a same type as the managed machine in which the trouble occurs, and controlling so as to output a analysis result of the trouble-coping history to one of the managed machine and the management terminal.

In order to solve the above-mentioned circumstances, a server according to an aspect of the present invention includes: a receiving unit configured to receive via a network information related to a result of self-diagnosis which is respectively transmitted from plural managed machines, and management information related to the condition of plural managed machines which is transmitted from a management terminal managing the managed machine; a memory unit configured to store the information related to the result of self-diagnosis and the management information related to the condition of the managed machine received by the receiving unit on a database; an analysis unit configured to analyze with use of the database a trouble-coping history of the managed machine which has a same type as the managed machine in which the trouble occurs, when the trouble occurs in the managed machine; and a transmitting unit configured to transmit an analysis result by the analysis unit to one of the managed machine in which the trouble occurs and the management terminal.

In order to solve the above-mentioned circumstances, there is a record medium in which a program used for a server connected to a managed machine and a management terminal via a network is recorded, according to an aspect of the present invention, wherein: information related to a result of self-diagnosis which is respectively transmitted from plural managed machines is received via a network, and management information related to the condition of plural managed machines which is transmitted from a management terminal managing the managed machine is received via a network; the information related to the received result of self-diagnosis is stored on a database and the received management information related to the condition of the managed machine is stored on a database; a trouble-coping history of the managed machine which has a same type as the managed machine in which the trouble occurs is analyzed with use of the database, when the trouble occurs in the managed machine; and an analysis result is transmitted to one of the managed machine in which the trouble occurs and the management terminal.

In order to solve the above-mentioned circumstances, a computer according to an aspect of the present invention includes: a receiving unit configured to receive via a network information related to a result of self-diagnosis which is respectively transmitted from plural managed machines, and management information related to the condition of plural managed machines which is transmitted from a management terminal managing the managed machine; a memory unit configured to store the information related to the result of self-diagnosis and the management information related to the condition of the managed machine received by the receiving unit on a database; an analysis unit configured to analyze with use of the database a trouble-coping history of the managed machine which has a same type as the managed machine in which the trouble occurs, when the trouble occurs in the managed machine; and a transmitting unit configured to transmit an analysis result by the analysis unit to one of the managed machine in which the trouble occurs and the management terminal.

In order to solve the above-mentioned circumstances, there is a record medium in which a program used for a computer connected to a managed machine and a management terminal via a network is recorded, according to an aspect of the present invention, wherein: information related to a result of self-diagnosis which is respectively transmitted from plural managed machines is received via a network, and management information related to the condition of plural managed machine which is transmitted from a management terminal managing the managed machine is received via a network; the information related to the received result of self-diagnosis is stored on a database and the received management information related to the condition of the managed machine is stored on a database; a trouble-coping history of the managed machine which has a same type as the managed machine in which the trouble occurs is analyzed with use of the database, when the trouble occurs in the managed machine; and an analysis result is transmitted to one of the managed machine in which the trouble occurs and the management terminal.

The nature and further characteristic features of the present invention will be made clearer from the following descriptions made with reference to the accompanying drawings.

BRIEF DESCRIPTION OF THE DRAWINGS

In the accompanying drawings:

FIG. 4 is a flowchart for describing coping process of a serviceman according to the first embodiment of the present invention;

FIG. 5 is a diagram showing a routine maintenance coping screen according to the first embodiment of the present invention;

FIG. 6 is a diagram showing a trouble coping screen according to the first embodiment of the present invention;

FIG. 7 is a diagram showing a display screen of a management terminal according to the first embodiment of the present invention;

FIG. 10 is a diagram for describing data analyzing method in time of trouble occurrence according to the first embodiment of the present invention;

DESCRIPTION OF THE PREFERRED EMBODIMENTS

With reference to the drawings, embodiments of the present invention will be described below.

First Embodiment

Figure 1:
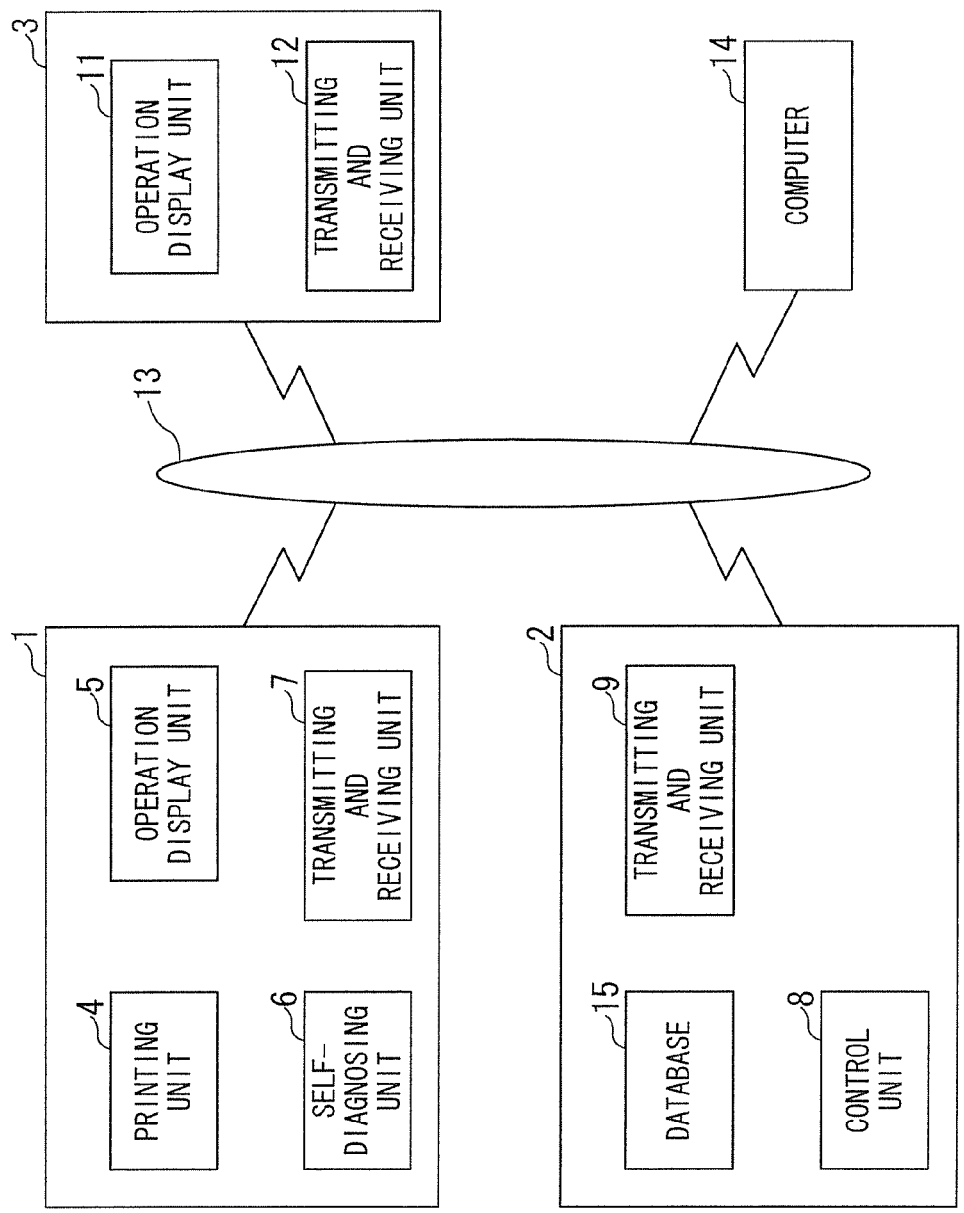
FIG. 1 is a diagram showing construction of a maintenance system according to a first embodiment of the present invention.

FIG. 1 shows a construction of a maintenance system according to a first embodiment of the present invention.

As shown in FIG. 1, the maintenance system is constructed by a managed machine 1 (a machine which is managed by a management terminal 3), a host server 2, the management terminal 3, and a computer 14. In addition, the managed machine 1, the host server 2, the management terminal 3, and the computer 14 are mutually connected via a network 13. It should be noted that plural managed machines are connected to the host server 2 via the network 13.

The managed machine 1 is constructed by a printing unit 4, an operation display unit 5, a self-diagnosing unit 6, and a transmitting and receiving unit 7. The host server is constructed by a control unit 8, a transmitting and receiving unit 9, and a database 15. The management terminal 3 is constructed by an operation display unit 11 and a transmitting and receiving unit 12.

The managed machine 1 such as a complex machine and a copy machine, and the like, has the printing unit 4. The managed machine performs a printing process in accordance with an operation inputted by the operation display unit 5.

In addition, each managed machine is allowed to communicate with the host server 2 and the computer 14 on the network 13 with use of an existing network technology such as the network 13 by LAN (Local Area Network) (not shown) and a router, a phone line, a modem, FAX, and the Internet. Accordingly, for example, the managed machine 1 can receive by the transmitting and receiving unit 7 an image forming data transmitted via the network 13 from the computer 14, perform the printing process based on the image forming data received from the computer 14.

Furthermore, each managed machine is provided with the self-diagnostic function executed by the self-diagnosing unit 6, and a result of self-diagnosis by the self-diagnosing unit 6 is appropriately transmitted to the host server 2 via the network 13. To be more specific, when any trouble occurs in the managed machine 1, the managed machine 1 can appropriately transmit information related to the trouble (an error status information 30 in FIG. 2) self-diagnosed by the self-diagnosing unit 6 to the host server 2. In addition, the managed machine 1 can routinely self-diagnose by itself with use of the self-diagnosing unit 6, and transmit an environmental information (the environmental information 32 in FIG. 2) to the host server 2 as the routine result related to self-diagnosis.

The host server 2 appropriately receives by the transmitting and receiving unit 9 various data such as the information related to the trouble (the error status information 30 in FIG. 2), the environmental information (the environmental information 32 in FIG. 2), and the like. Next, the host server 2 registers these received data in the database 15, performing to compile a database with respect to the database 15. Herewith, the control unit 8 of the host server 2 controls the managed machine 1 connected to the host server 2 via the network 13 with use of thus database 15.

Next, the management terminal 3 which is capable of making sure a maintenance status of the managed machine 1 is connected to the network 13, if needed. The management terminal 3 is provided with the operation display unit 11. When the serviceman operates the management terminal 3, the maintenance status of the managed machine 1 is appropriately inputted.

When the serviceman performs a routine maintenance for the managed machine 1, routine maintenance information (the routine maintenance information 34 in FIG. 2) is inputted by the management terminal 3. On the other hand, when the serviceman performs a trouble coping for the managed machine 1, trouble coping information (the trouble coping information 36 in FIG. 2) is inputted by the management terminal 3.

These informations (the routine maintenance information 34 and the trouble coping information 36) are transmitted to the host server 2 via the network 13 by the transmitting and receiving unit 12 of the management terminal 3.

In addition, the management terminal 3 can receive by the transmitting and receiving unit 12 via the network 13 the information related to the trouble (that is, the error status information 30 in FIG. 2) which is managed by the database 15 of the host server 2, and the environmental information (the environmental information 32 in FIG. 2), displaying thus informations received by the operation display unit 11.

Figures 2, 3:
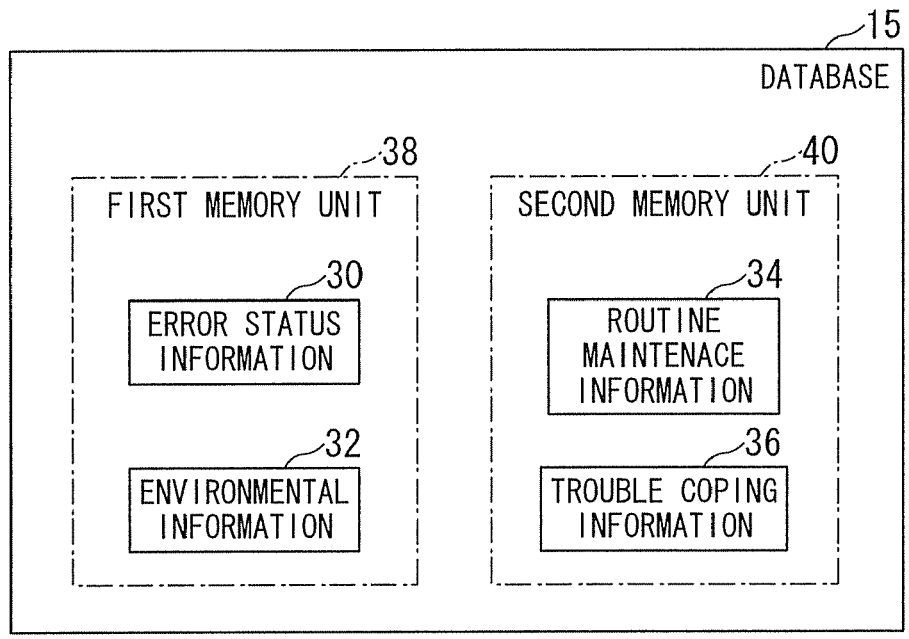
FIG. 2 is a diagram showing construction of a database according to a first embodiment of the present invention.
FIG. 3 is a diagram showing construction of an error status information according to the first embodiment of the present invention.

FIG. 2 shows a construction of a database managed by the database 15 of the host server 2. The database 15 is constructed by a first memory 38 and a second memory 40. The first memory 38 stores the error status information 30 and the environmental information 32. On the other hand, the second memory 40 stores the routine maintenance information 34 and the trouble coping information 36. When new informations are received by the transmitting and receiving unit 9, thus informations registered in the database 15 are updated in each case with use of the new information.

FIG. 3 shows a construction of the error status information 30 registered in the database 15.

When any trouble occurs in the managed machine 1, the error status information 30 is transmitted to the host server 2 via the network 13. Thereafter, thus error status information 30 is registered in the database 15 of the host server 2. As shown in FIG. 3, the error status information 30 is constructed by a serial number used to identify the managed machine 1, an error code which indicates an error (a trouble content) occurring in the managed machine 1, time of trouble occurrence which is the time in the error (the trouble) occurred in the managed machine 1, and the like.

The error status information 30 is transmitted to the management terminal 3 hold by the serviceman if needed. Thereafter, the serviceman performs trouble coping for the managed machine 1 based on the error status information 30 transmitted form the host server 2. At this time, a coping content in the case which the serviceman performs the routine maintenance or the trouble coping is registered in the database 15 as the routine maintenance information 34 or the trouble coping information 36 as well as the error status information 30. It should be noted that the coping performed by the serviceman is illustrated with reference to FIG. 4 to FIG. 6.

With reference to flowchart of FIG. 4, the coping performed by the serviceman will be described.

There are a coping in the routine maintenance and a coping in the time of trouble occurrence in the coping performed by the serviceman. The coping performed by the serviceman is started (Step S51), if it is in the routine maintenance (if it is determined that it is Yes in Step S53), the serviceman performs the coping in the routine maintenance (Step S55). Thereafter, with use of the management terminal 3, the serviceman inputs working content on the routine maintenance coping screen displayed on the operation display 3 of the management terminal 3. The management terminal 3 inputs working content on the routine maintenance coping screen displayed on the operation display unit 11 of the management terminal 3 in accordance with the operation of the serviceman (Step S57).

On the other hand, if it is not in the routine maintenance (if it is determined that it is No in Step S53), the serviceman performs the trouble coping (Step S59). Thereafter, with use of the management terminal 3, the serviceman inputs working content on the trouble coping screen displayed on the operation display 3 of the management terminal 3. The management terminal 3 inputs working content on the trouble coping screen displayed on the operation display unit 11 of the management terminal 3 in accordance with the operation of the serviceman (Step S61).

When the serviceman operates the management terminal 3, the routine maintenance information is inputted on the routine maintenance coping screen. Further, when the serviceman operates the management terminal 3, the trouble coping information is inputted on the trouble coping screen. At this time, the management terminal 3 transmits thus informations (the routine maintenance information 34 and the trouble coping information 36) to the host server 2 via the network 13 by the transmitting and receiving unit 12 (Step S65). The host server 2 receives thus informations (the routine maintenance information 34 and the trouble coping information 36), and registers thus received informations, performing to compile a database (Step S67). Therefore, the working of the serviceman is to be ended, and the coping process performed by the serviceman is to be ended.

Next, FIG. 5 shows the routine maintenance coping screen displayed on the operation display unit 11 of the management terminal 3 in the case of the routine maintenance coping. In addition, FIG. 6 shows the trouble coping screen displayed on the operation display unit 11 of the management terminal 3 in the case of the trouble coping.

In the case of the routine maintenance coping, when the serviceman performs the routine maintenance, the serviceman inputs various data with use of the operation display unit 11 of the management terminal 3. As shown in FIG. 5, in the case of the routine maintenance coping, the management terminal 3 inputs the serial number used to identify the managed machine 1, maintenance items such as cleaning of part (parts), the time when maintenance of the managed machine 1 is performed by the serviceman, and the like, in accordance with the operation of the serviceman.

FIG. 6 shows the trouble coping screen displayed on the operation display unit 11 of the management terminal 3 in the case of the trouble coping. That is, this screen is an input screen to input trouble information with use of the operation display unit 11 of the management terminal 3 when the serviceman performs the trouble coping. In the case of the trouble coping, the management terminal 3 inputs the serial number used to identify the managed machine 1, the time of trouble occurrence, the time when the trouble coping of the managed machine 1 is performed by the serviceman, content of the trouble, coping content for the trouble, parts cleaned or exchanged in the case of the trouble coping, and the like, in accordance with the operation of the serviceman.

Furthermore, in the case of the trouble coping, the management terminal 3 inputs a detail description by the serviceman in accordance with the operation of the serviceman. Herewith, it is possible that the serviceman refers to the detail description when the same trouble occurs in the managed machine 1. Instead of the trouble information inputted on the trouble coping screen, the error status information 30 self-diagnosed by the managed machine 1 may be automatically inputted as the trouble information on the trouble coping screen. In addition, thus data is transmitted to the host server 2 via the network 13 after thus data is inputted by the management terminal 3, and registered in the database 15 of the host server 2.

Incidentally, not only data transmitted to the host server 2 from the management terminal 3 in case of the routine maintenance coping and in the case of the trouble coping, but also data routinely transmitted to the host server 2 from plural machines by self-diagnostic function executed by the self-diagnosing unit 6 is performed to compile a database with respect to the database 15. Therefore, when the management terminal 3 is connected to the network 13 by the serviceman, the management terminal 3 can be allowed to access to the database 15 of the host server 2. As shown in FIG. 7, data managed by the database 15 of the host server 2 is displayed on the operation display unit 11 of the management terminal 3.

FIG. 7 shows a display example displayed on the operation display unit 11 of the management terminal 3 in FIG. 1 when the management terminal 3 accesses to the database 15 of the host server 2.

As shown in FIG. 7, the operation display unit 11 of the management terminal 3 displays the serial number used to identify the managed machine 1, the error code which indicates the error (the trouble content), coping content for the trouble, parts with respect to the trouble coping, and the like. Herewith, the serviceman understands what kind of trouble occurred in the managed machine 1 in past times and also what coping was performed in the managed machine 1 in that time of trouble occurrence.

Actually, when the trouble occurs in the managed machine 1, the serviceman performs any trouble coping on the spot. At this time, it is important that the serviceman understands in advance what coping was performed in the managed machine 1 in the time of trouble occurrence because this understanding of the serviceman has important influence on advance understanding of necessary parts and coping for the trouble occurring in the managed machine 1 at present. It is desired that the management terminal 3 or the managed machine 1 displays specific data extracted from the database 15 of the host server 2 when the trouble occurs in respective managed machines 1.

Figures 8, 9:
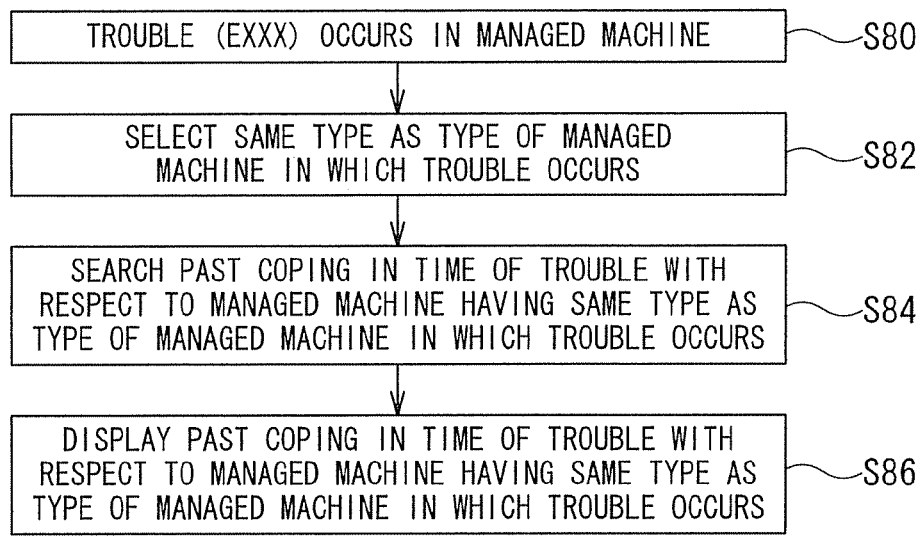
FIG. 8 is a flowchart for describing data analyzing process in time of trouble occurrence according to the first embodiment of the present invention.
FIG. 9 is a diagram for describing data extracting method in the time of trouble occurrence according to the first embodiment of the present invention.

With reference to flowchart of FIG. 8, the data analysis process in the time of trouble occurrence of the host server 2 in FIG. 1 will be described.

When the trouble (for example, error code EXXXX) occurs in the managed machine 1 (Step S80), the host server 2 selects the same type as type of the managed machine 1 in which the trouble occurs (Step S82). Next, with reference to the database 15, the host server 2 searches past coping in time of trouble occurrence with respect to the managed machine 1 having the same type as the type of the managed machine 1 in which the trouble occurs. Furthermore, the host server 2 extracts data with respect to the same error code (for example, error code EXXXX) as the error code corresponding to the trouble which occurs in the managed machine 1 (Step S84). The host server 2 analyzes the data extracted form the database 15 and makes the managed machine 1 or the management terminal 3 to display the past coping performed in the case of the same type and the same error code (Step S86).

Next, with reference to flowchart of FIG. 9, the data extracting method in the time of trouble occurrence of the host server 2 in FIG. 1 will be described.

For example, when the trouble indicated by the error code E160 occurs in the managed machine 1 identified by the serial number A00116, the managed machine 1 transmits to the host server 2 via the network 13 the error status information 30 including the serial number A00116 used to identify the managed machine 1, the error code E160 which indicates the trouble, and the time of trouble occurrence, by the transmitting and receiving unit 7. Thereafter, the host server 2 receives the error status information 30 from the managed machine 1 via the network 13, and extracts the same trouble (that is, the trouble indicated by the same error code E160) which occurred in past times in the managed machine 1 of the same type identified by the serial number A00116, based on the received error information 30 with reference to the database 15.

Notably, data which indicates type number (for example one of A, B, and the like) of the managed machine 1 is added to the serial number. According to the embodiments of the present invention, the first initial alphabet of the serial number indicates type of the managed machine 1. Therefore, in the extract process, the data with respect to case where the first initial alphabet of the serial number is [A] and the error code is E160 is extracted from the database 15. As a result, when the trouble indicated by the error code E160 occurs in the managed machine identified by the serial number A001160, as shown in FIG. 9, information related to the serial number, the error code, coping content for the trouble, parts with respect to the trouble coping, and the like, are extracted from the database 15. Thereafter, a result related to this extraction is displayed on the management terminal 3 hold by the serviceman or the managed machine 1 in accordance with the host server 2.

With reference to flowchart of FIG. 10, the data analysis method in the time of trouble occurrence of the host server 2 in FIG. 1 will be described.

The control unit 4 of the host server 2 analyzes the trouble-coping history based on the information (the result related to this extraction) extracted from the database 15, rearranging thus trouble-coping history. The control unit 4 of the host server 2 can make the operation display unit 5 of the managed machine 1 or the operation display unit 11 of the management terminal 3 to display thus result related to this analysis. In this analysis method, when the trouble indicated by the error code E160 occurs in the managed machine 1 identified by the serial number A00116, the control unit 4 of the host server 2 analyzes the amount of percentage in respective trouble copings performed by the serviceman in past times and makes the operation display unit 5 of the managed machine 1 or the operation display unit 11 of the management terminal 3 to display in order of the amount of percentage. In addition, the control unit 4 of the host server 2 analyzes the amount of percentage of parts treated in respective trouble copings performed by the serviceman in past times and makes the operation display unit 5 of the managed machine 1 or the operation display unit 11 of the management terminal 3 to display in order of the amount of percentage of parts.

Herewith, serviceman and user easily performs precise trouble coping for the trouble occurring in the managed machine 1 with use of informations displayed on the operation display unit 5 of the managed machine 1 or the operation display unit 11 of the management terminal 3.

Figure 11:
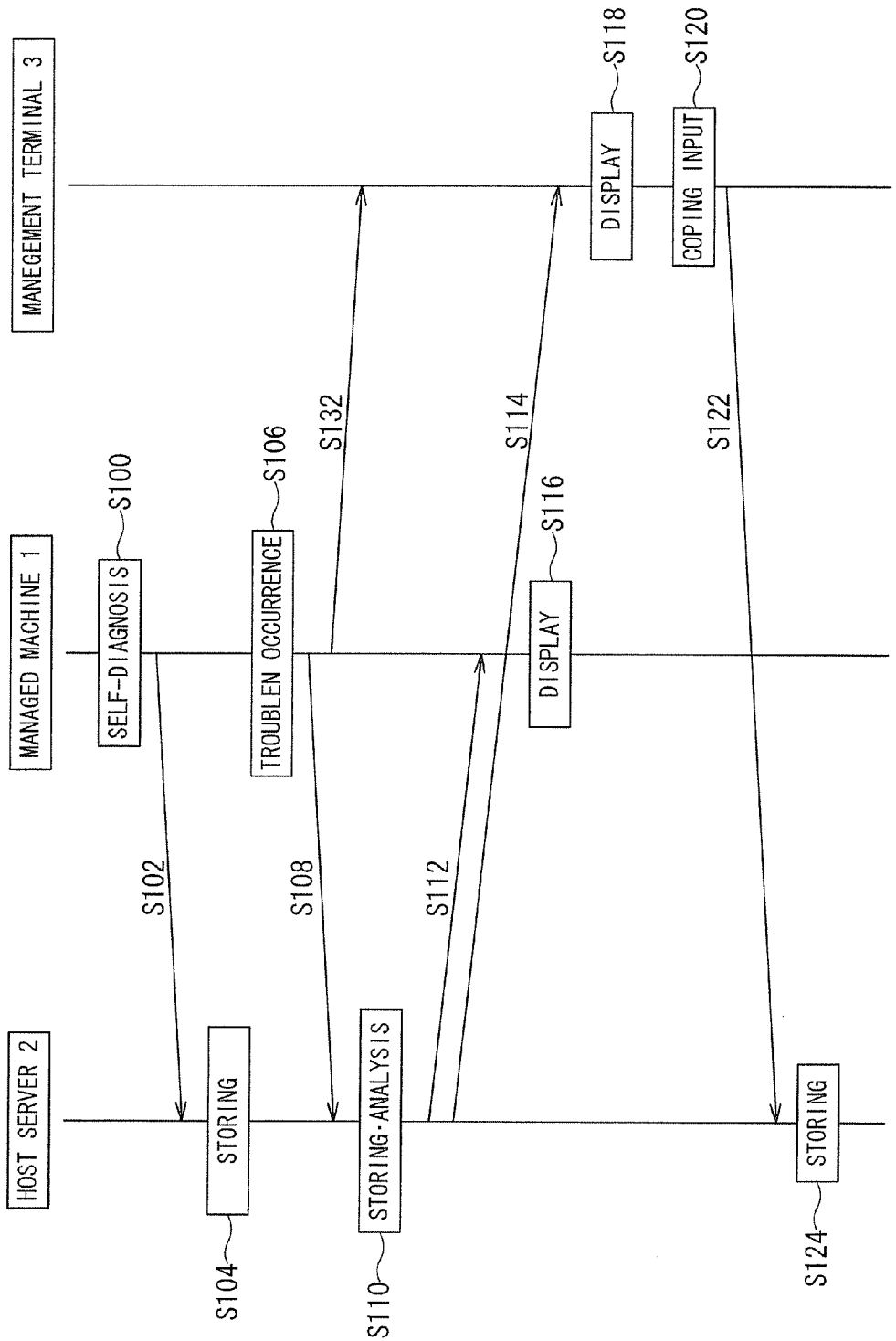
FIG. 11 is a flowchart for describing process in a managed machine, the management terminal, and a host server according to a first embodiment of the present invention.

With reference to flowchart of FIG. 11, process in the managed machine 1, the host server 2, and the management terminal 3 in FIG. 1 will be described.

In general, the managed machine 1 routinely self-diagnoses by the self-diagnosing unit 6 (Step S100) and transmits the result related to self-diagnosis (self-diagnosis data) to the host server 2 via the network 13 (Step S102). In addition, the host server 2 registers (stores) thus result related to self-diagnosis (self-diagnosis data) in the database 15 (Step S104).

Next, when the trouble occurs in the managed machine 1 (Step S106), the managed machine 1 transmits the error status information 30 to the host server 2 via the network 13 (Step S108). The host server 2 receives the error status information 30 from the managed machine 1 and the host server 2 registers (stores) thus error status information 30 in the database 15. Thereafter, the host server 2 analyzes the error status information and extracts data with respect to the same trouble occurring in the managed machine 1 of the same type as type of the managed machine 1 in which the trouble occurs (Step S110).

Further, the host server 2 transmits to the managed machine 1 thus extracted data with respect to the same trouble occurring in the managed machine 1 of the same type as type of the managed machine 1 in which the trouble occurs (Step S112). On the other hand, the host server 2 transmits to the management terminal 3 thus extracted data with respect to the same trouble occurring in the managed machine 1 of the same type as type of the managed machine 1 in which the trouble occurs (Step S114). As a result, the host server 2 makes the operation display unit 5 of the managed machine 1 to display past coping as shown in FIG. 9 to FIG. 10 (Step S116). On the other hand, the host server 2 makes the operation display unit 5 of the management terminal 3 to display past coping as shown in FIG. 9 to FIG. 10 (Step S118).

In addition, the serviceman performs the trouble coping with reference to display screen displayed on the operation display unit 5 of the management terminal 3 or the operation display unit 11 of the managed machine 1 and inputs the performed trouble coping to the management terminal 3 (Step S120). Thereafter, thus data related to the trouble coping is transmitted to the host server 2 via the network 13 (Step S122) and registered (stored) in the database 15 of the host server 2 (Step S124). Furthermore, when new trouble occurs in the managed machine 1, the same processes are repeatedly performed. Thereafter, the database 15 of the host server 2 is updated.

Second Embodiment

Next, with reference to FIG. 12 to FIG. 15, the second embodiment of the present invention will be described. It should be noted that the construction of the whole system are similar to the first embodiment of the present invention, hereinafter, the same number is used. In addition, a description thereof will be omitted to avoid the repetition.

Figures 12, 13:
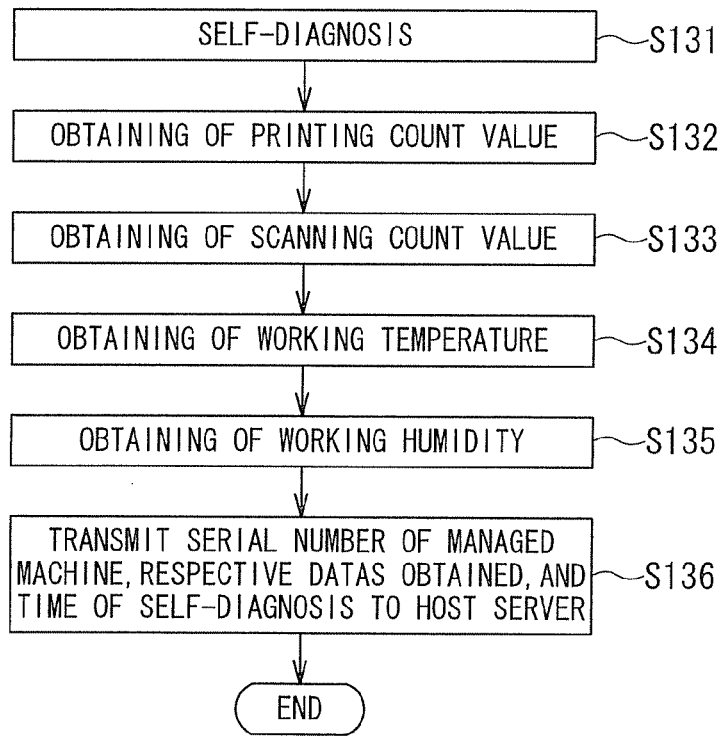
FIG. 12 is a diagram showing construction of a database according to a second embodiment of the present invention.
FIG. 13 is a flowchart for describing transmitting process of a result related to self-diagnosis according to the second embodiment of the present invention.

FIG. 12 shows a construction of a database managed by the database 15 of the host server 2.

The managed machine 1 routinely self-diagnoses by the self-diagnosing unit 6 and transmits various data including thus result related to self-diagnosis to the host server 2 via the network 13. Thus various data includes the serial number used to identify the managed machine 1, access time (self-diagnosis time) in self-diagnosing the managed machine 1, and furthermore the environmental information 32 of the managed machine 1. The environmental information 32 includes the temperature (working temperature) and humidity (working humidity) of the managed machine 1 as the set environment, printing count (working numbers of time), scanning count, and the like. Thus environmental information 32 is routinely transmitted to the host server 2. It should be noted that an interval time in routinely self-diagnosing may be flexibly set in accordance with the preference of the user and the serviceman with use of the operation display unit 5 of the managed machine 1 or the operation display unit 11 of the management terminal 3.

With reference to FIG. 13, the transmit process of the result related to self-diagnosis in the managed machine 1 in FIG. 1 will be described.

When the self-diagnosis is started, the managed machine 1 obtains a printing count value (Step S132), and furthermore obtains a scanning count value (Step S133). In addition, the managed machine 1 obtains the internal temperature of the managed machine 1 (Step S134), and obtains the internal humidity of the managed machine 1 (Step S135). Thereafter, the managed machine 1 transmits to the host server 2 as the result related to self-diagnosis the serial number used to identify the managed machine 1, various data obtained in the Step S132 to Step S135, and the self-diagnosis time (the access time) (Step S136).

Figure 14:
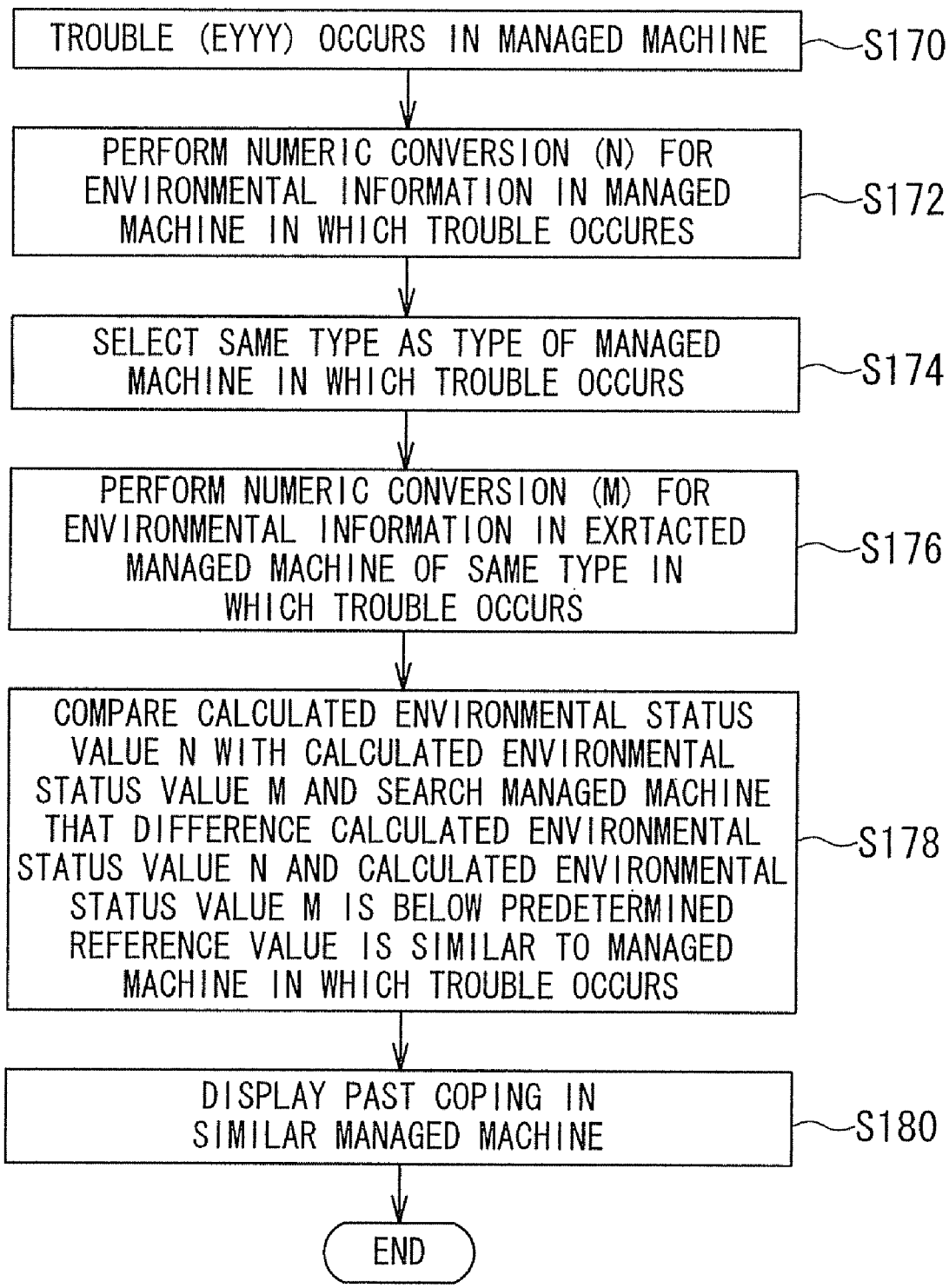
FIG. 14 is a flowchart for describing data analyzing process in time of trouble occurrence according to the second embodiment of the present invention.

With reference to FIG. 14, the data analysis process in the time of trouble occurrence of the host server 2 in FIG. 1 will be described.

When the trouble (error code EYYY) occurs in the managed machine 1 (Step S170), the control unit 4 of the host server 2 performs numeric conversion for the environmental information 32 in the managed machine 1 in which the trouble occurs and thereof obtains a environmental status value (Step S172). For example, N as the environmental status value is obtained. Next, the control unit 4 of the host server 2 extracts data related to the same the type as the type of the managed machine 1 in which the trouble occurs and selects the same type as type of the managed machine 1 in which the trouble occurs (Step S174). Thereafter, the control unit of the host server 2 performs numeric conversion for the environmental information 32 in the extracted managed machine 1 of the same type and thereof obtains a environmental status value (Step S176). For example, M as the environmental status value is obtained.

Next, the control unit 4 of the host server 2 compares thus calculated environmental status value N with thus calculated environmental status value M. If it is determined that the difference between the environmental status value N and the environmental status value M is below a predetermined reference value (for example, 10% etc.), the control unit 4 of the host server 2 recognizes that the managed machine 1 having the environmental status value M is the same type of the managed machine 1 in which the trouble occurs, and similar to the managed machine in which the trouble occurs (Step S178). That is, the control unit 4 of the host server 2 recognizes that the managed machine 1 having the environmental status value M is a similar managed machine similar to the managed machine 1 in which the trouble occurs. Further, the host server 2 makes the managed machine 1 or the management terminal 3 to display (inform) past coping in the similar managed machine (Step S180).

Figure 15:
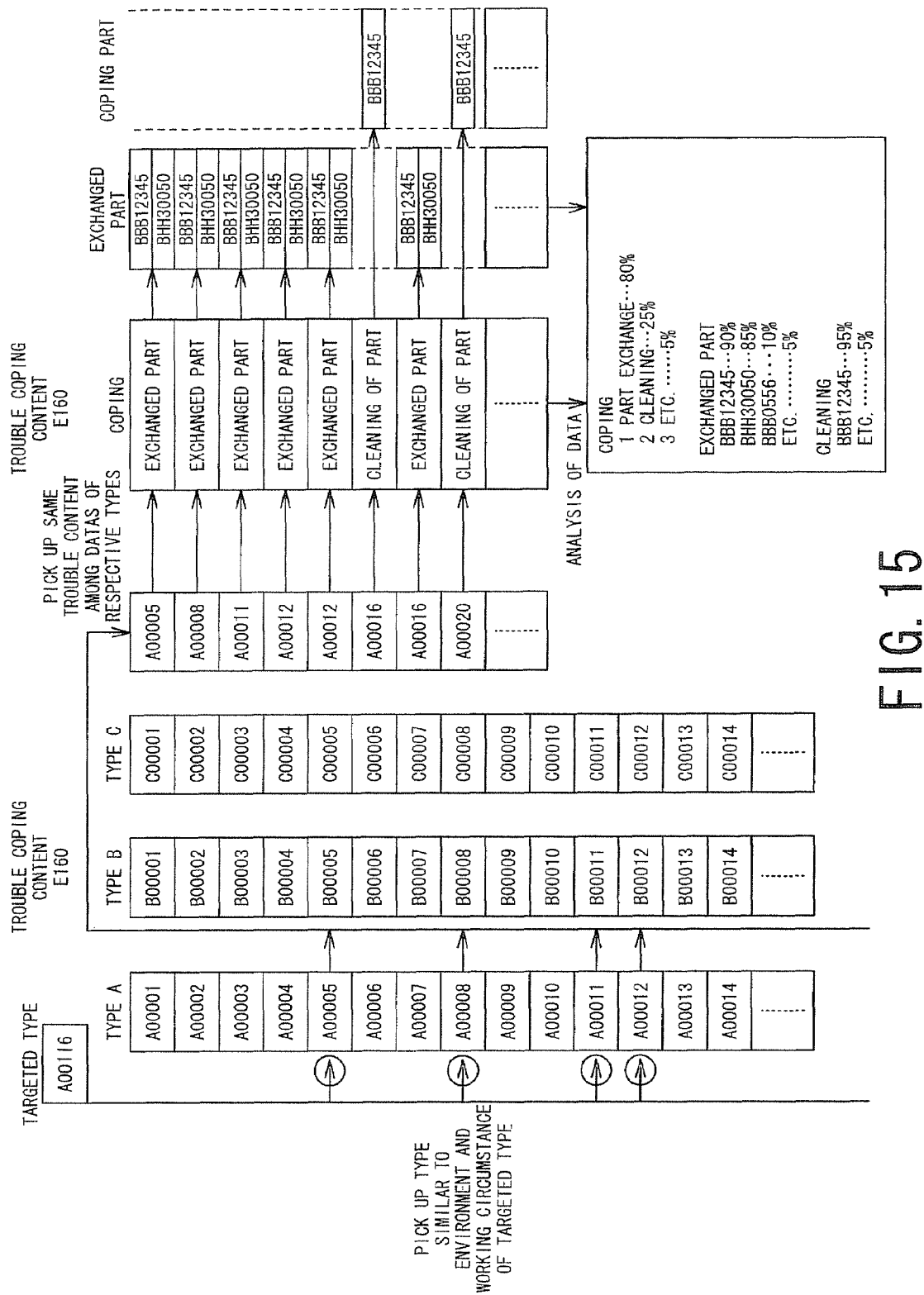
FIG. 15 is a diagram for describing data extracting method in time of trouble occurrence according to the second embodiment of the present invention.

With reference to FIG. 15, the data extracting method in the time of trouble occurrence of the host server 2 in FIG. 1 will be described.

As well as the first embodiment of the present invention, the case where the trouble indicated by the error code E160 occurs in the managed machine 1 identified by the serial number A00116 will be described. For example, when the trouble indicated by the error code E160 occurs in the managed machine 1 identified by the serial number A00116, the managed machine 1 transmits to the host server 2 via the network 13 the error status information 30 including the serial number A00116 used to identify the managed machine 1, the error code E160 which indicates the trouble, and the time of trouble occurrence, by the transmitting and receiving unit 7. Thereafter, the host server 2 receives the error status information 30 from the managed machine 1 via the network 13, and extracts the same trouble (that is, the trouble indicated by the same error code E160) which occurred in past times in the managed machine 1 of the same type identified by the serial number A00116, based on the received error information 30 with reference to the database 15.

Furthermore, the control unit 4 of the host server 2 extracts the managed machine 1 whose environmental information is similar to the environmental information in the managed machine in which the trouble occurs at present among the managed machines 1 of the same type which the trouble occurred in past times. Notably, the environmental information 32 means informations related to be the printing count, the scanning count, working temperature, and working humidity.

It should be noted that when the managed machine 1 whose environmental information is similar to the environmental information in the managed machine in which the trouble occurs at present is extracted in extracting process, for example, the managed machine 1 may be extracted where the printing count, the scanning count, the working temperature, and the working humidity included in the environmental information 32 are respectively below respective predetermined reference values.

In addition, the control unit 4 of the host server 2 calculates the environmental status value in advance based on a function related to the environmental information 32 in the managed machine 1, and the managed machine 1 may be extracted where the calculated environmental status value are below the predetermined reference values.

Next, after the managed machine 1 which is similar to the managed machine (for example, the managed machine identified by the serial number A00116) in which the trouble occurs is extracted, the control unit 4 of the host server 2 analyzes the trouble-coping history in the case where the trouble indicated by the error code E160 occurs in these managed machines 1. As a result, in case of FIG. 15, when the trouble indicated by the error code E160 occurred in the managed machine 1 identified by the serial number A00116, it is recognized in the host server 2 that parts identified by BBB12345 and BHH30050 were exchanged. Therefore, with respect to the trouble coping for the trouble indicated by the error code E160, it can be recognized in the host server 2 that parts exchange and parts cleaning were performed. In addition, coping parts in cleaning can be recognized in the host server 2.

In addition, the control unit 4 of the host server 2 analyzes the trouble-coping history, rearranging trouble-coping history. Thereafter, the control unit 4 of the host server 2 makes the operation display unit 5 of the managed machine 1 or the operation display unit 11 of the management terminal 3 to display the display screen as shown in FIG. 7.

At this time, the operation display unit 5 of the managed machine 1 or the operation display unit 11 of the management terminal 3 may display to list the trouble coping in order of the amount of percentage which is performed in the managed machine 1 (for example, the managed machine identified by the serial number A00116) where the trouble occurs. In addition, the operation display unit 5 of the managed machine 1 or the operation display unit 11 of the management terminal 3 may display thus percentage of the trouble coping and exchanged parts in itself.

According to the second embodiment of the present invention, when the trouble indicated by the error code E160 occurs, the serviceman and the user realizes that parts exchanging is performed at a rate of 80%, the exchanged part is BBB12345 at a rate of 90%, and the exchanged part is BHH30050 at a rate of 85%.

Herewith, when the trouble occurs in the managed machine 1, the serviceman promptly understands precise trouble content, precise trouble coping, and necessary parts based on informations displayed on the managed machine 1 or the management terminal 3. Accordingly, it is possible that more precise maintenance information is more promptly provided to the serviceman and the user.

Furthermore, the control unit of the host server 2 performs the analysis based on the updated database 15. Therefore, the control unit of the host server 2 can perform more precise and practical-type analysis compared with a related case where a trouble coping program in time of the trouble occurrence is incorporated into the host server 2 in advance. As a result, odds that there are not necessary parts used in the trouble coping when the serviceman goes to the user site can be drastically reduced. In addition, the trouble-coping history with respect to the managed machine 1 similar to the working environment can be extracted. For the reason, it is possible that more precise information is provided to the serviceman and the user.

Then, the series of processes described in the embodiment of the present invention can be executed by a software as well as a hardware.

Furthermore, according to the embodiment of the present invention, for the steps in the flowcharts, the example in which the processes are executed in the stated order in a time oriented manner has been described, but an example in which the processes are executed in parallel or individually executed while not necessarily executed in the time oriented manner may also be included in the steps.

What is claimed is:

1. A maintenance system comprising a managed machine a management terminal managing the managed machine and a server connected to the managed machine and the management terminal via a network, wherein:

the managed machine comprises:

a self-diagnosing unit configured to self-diagnose a condition of the managed machine; and a first transmitting unit configured to transmit information related to a result of self-diagnosis by the self-diagnosing unit to the server;

the management terminal comprises:

an input receiving unit configured to receive an input of management information related to a condition of the managed machine; and a second transmitting unit configured to transmit the management information related to the condition of the managed machine whose input is received by the input receiving unit to the server, and, the server comprises:

a receiving unit configured to receive the information related to the result of self-diagnosis transmitted by the first transmitting unit and the management information related to the condition of the managed machine transmitted by the second transmitting unit;

a memory unit configured to store the information related to the result of self-diagnosis and the management information related to the condition of the managed machine on a database which includes a first memory and a second memory, the first memory storing as the information related to the result of self-diagnosis an error status information including an error code which indicates the trouble occurring in the managed machine and an information related to time of trouble occurrence, and an environmental information including information related to working temperature, working humidity, and working numbers of times in the managed machine, and the second memory storing as the management information related to the condition of the managed machine a routine maintenance information including information related to a maintenance content in a routine maintenance coping and information related to a part which is exchanged or cleaned in the routine maintenance coping, and a trouble coping information including information related to trouble coping place, trouble coping content, and working part corresponding to the trouble in trouble coping, and a control unit configured to analyze the database when a trouble occurs in the managed machine, analyze a trouble-coping history of the managed machine which has a same type as the managed machine in which the trouble occurs, and control so as to output a analysis result of the trouble-coping history to one of the managed machine and the management terminal.

2. The maintenance system according to claim 1, wherein one of the managed machine and the management terminal further comprises an informing unit configured to inform the analysis result of the trouble-coping history outputted by the control unit.

3. The maintenance system according to claim 1, wherein one of the managed machine and the management terminal further comprises an output unit configured to output the analysis result of the trouble-coping history in accordance with control by the control unit.

4. The maintenance system according to claim 1, wherein the control unit configured to perform numeric conversion for the environmental information in respective managed machines, compares the environmental information of the managed machine in which the trouble occurs with the environmental information of the managed machine which has the same type as the managed machine in which the trouble occurs, if it is determined that difference between the environmental information of the managed machine in which the trouble occurs and the environmental information of the managed machine which has the same type as the managed machine in which the trouble occurs, is below a predetermined reference value, to recognize that the managed machine that the difference is below the predetermined reference value is similar to the managed machine in which the trouble occurs, to analyze a trouble-coping history of a similar managed machine, and to control so as to output a analysis result of the trouble-coping history to one of the managed machine and the management terminal.

5. The maintenance system according to claim 1, wherein the first transmitting unit routinely configured to transmit the information related to the result of self-diagnosis to the server, and to transmit the information related to the result of self-diagnosis to the server in the time of trouble occurrence.

6. The maintenance system according to claim 1, wherein the managed machine, the management terminal, and the server are mutually connected via one of LAN, the Internet, and phone line.

7. A method of controlling a maintenance system comprising a managed machine, a management terminal managing the managed machine and a server connected to the managed machine and the management terminal via a network, wherein:

the managed machine performs:
self-diagnosing a condition of the managed machine; and
transmitting information related to a result of self-diagnosis to the server;

the management terminal performs:
receiving an input of management information related to a condition of the managed machine; and
transmitting the management information related to the condition of the managed machine whose input is received to the server, and, the server performs:
receiving the information related to the result of self-diagnosis transmitted and the management information related to the condition of the managed machine transmitted;
storing the information related to the result of self-diagnosis and the management information related the condition of the managed machine on a database, the database storing as the information related to the result of self-diagnosis an error status information including an error code which indicates the trouble occurring in the managed machine and an information related to time of trouble occurrence, and an environmental information including information related to working temperature, working humidity, and working numbers of times in the managed machine, and the database storing as the management information related to the condition of the managed machine a routine maintenance information including information related to a maintenance content in a routine maintenance coping and information related to a part which is exchanged or cleaned in the routine maintenance coping, and a trouble coping information including information related to trouble coping place, trouble coping content, and working part corresponding to the trouble in trouble coping, and analyzing the database when a trouble occurs in the manage machine, analyzing a trouble-coping history of the managed machine which has a same type as the managed machine in which the trouble occurs, and controlling so as to output a analysis result of the trouble-coping history to one of the managed machine and the management terminal.

8. The method of controller a maintenance system according to claim 7, wherein one of the managed machine and the management terminal informs the analysis result of the trouble-coping history outputted by the server.

9. The method of controller a maintenance system according to claim 7, wherein one of the managed machine and the management terminal outputs the analysis result of the trouble-coping history in accordance with control by the server.

10. The method of controller a maintenance system according to claim 9, wherein the server performs numeric conversion for the environmental information in respective managed machines, compares the environmental information of the managed machine in which the trouble occurs with the environmental information of the managed machine which has the same type as the managed machine in which the trouble occurs, if it is determined that difference between the environmental information of the managed machine in which the trouble occurs and the environmental information of the managed machine which has the same type as the managed machine in which the trouble occurs, is below a predetermined reference value, recognizes that the managed machine that the difference is below the predetermined reference value is similar to the managed machine in which the trouble occurs, analyzes a trouble-coping history of a similar managed machine, and controls so as to output a analysis result of the trouble-coping history to one of the managed machine and the management terminal.

11. The method of controlling a maintenance system according to claim 7, wherein the managed machine routinely transmits the information related to the result of self-diagnosis to the server, and transmits the information related to the result of self-diagnosis to the server in the time of trouble occurrence.

12. The method of controlling a maintenance system according to claim 7, wherein the managed machine, the management terminal, and the server are mutually connected via one of LAN, the Internet, and phone lines.

* * * * *